Oct. 20, 1970  H. WESTLINNING ET AL  3,534,594
PRESSURE CONTROL IN A VULCANIZING TEST CHAMBER
Filed Aug. 30, 1968  3 Sheets-Sheet 1

INVENTORS
Hermann Westlinning
Siegfried Wolff
Jes Vogt

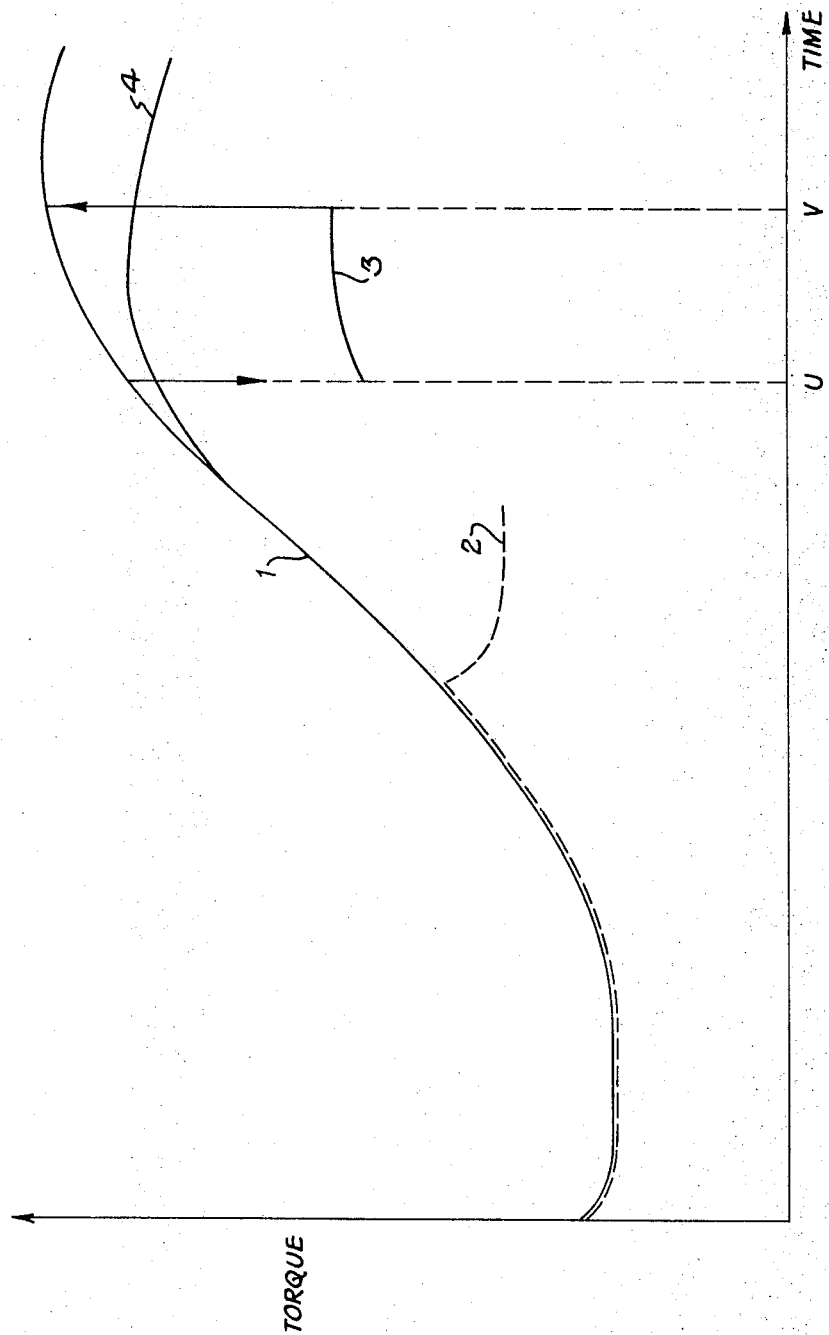

United States Patent Office 3,534,594
Patented Oct. 20, 1970

3,534,594
PRESSURE CONTROL IN A VULCANIZING TEST CHAMBER
Hermann Westlinning, Kleinostheim, Siegfried Wolff, Bruhl, and Jes Vogt, Grossauheim, Germany, assignors to Deutsche Gold- und Silber-Scheideanstalt vormals Roessler, Frankfurt am Main, Germany
Filed Aug. 30, 1968, Ser. No. 756,640
Claims priority, application Germany, Sept. 5, 1967, 1,648,438
Int. Cl. G01n 3/32
U.S. Cl. 73—101                 3 Claims

ABSTRACT OF THE DISCLOSURE

In measuring the resistance to shear on a test piece in the test chamber of a vulcanizing measuring apparatus, such as an oscillating disc rheometer, an undesirable reduction in torque is prevented by applying fluid pressure on a membrane bearing on the test piece.

---

This invention relates to a method and apparatus for adjusting and controlling the pressure on test pieces in a testing chamber for an instrument used to test the resistance to shearing and the vulcanizing effect on plastic and rubber elastic materials.

Instruments for testing for shearing resistance of plastic materials do not give consistent readings and are therefore of doubtful accuracy. The discrepancies are believed to be due to the fact that the pressure on a material being polymerized in a test chamber changes during the test time.

The object of this invention is to control the pressure in the test chamber of an instrument for measuring the resistance to shearing and the vulcanizing effect on plastic materials, especially in a torsion-thrust vulcameter and/or an oscillating disc rheometer.

In general, this object is obtained by placing a flexible membrane in the test chamber in contact with the test material and applying fluid pressure to the membrane to change the pressure on the material. A pressure sensitive element is placed in contact with the material so that the actual pressure value on the material can be compared with the theoretical pressure value, and the differences used to control the pressure on the membrane.

The means by which the objects of this invention are obtained are described more fully with reference to the accompanying drawings, in which:

FIG. 3 is a plot of curves showing comparative performances of the instruments of FIGS. 1 and 2.

Figure 1:
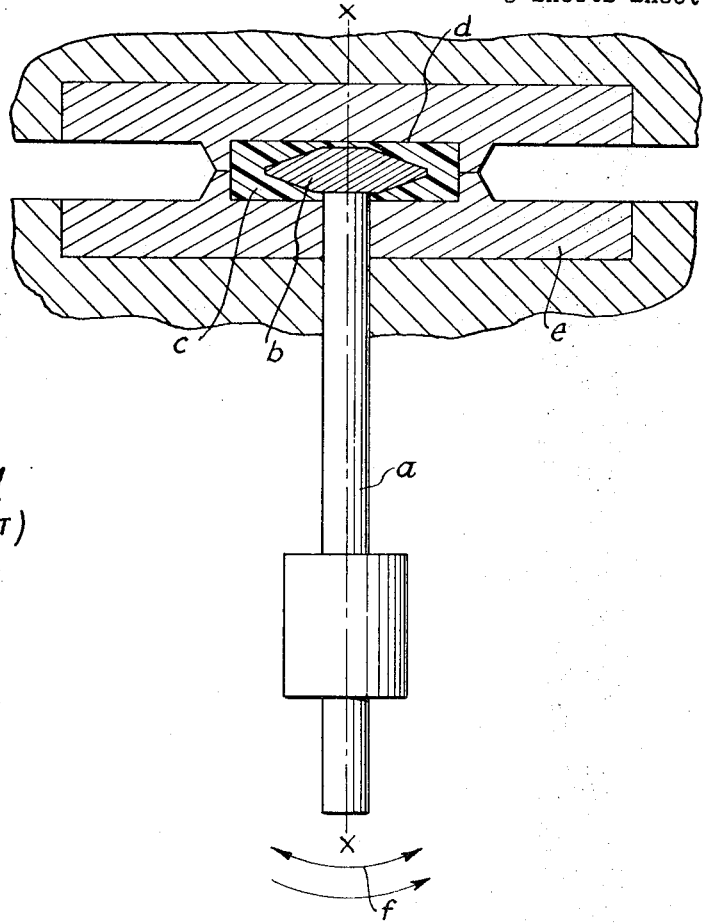
FIG. 1 is a cross-sectional view through a prior art test instrument.

As shown in FIG. 1, the shaft $a$ of the test instrument is connected to a disc $b$ embedded in the test material $c$ contained in the test chamber $d$ of a heated and separable mold $e$. Shaft $a$ oscillates about its axis $x$—$x$ as indicated by the arrows $f$.

Figure 2:
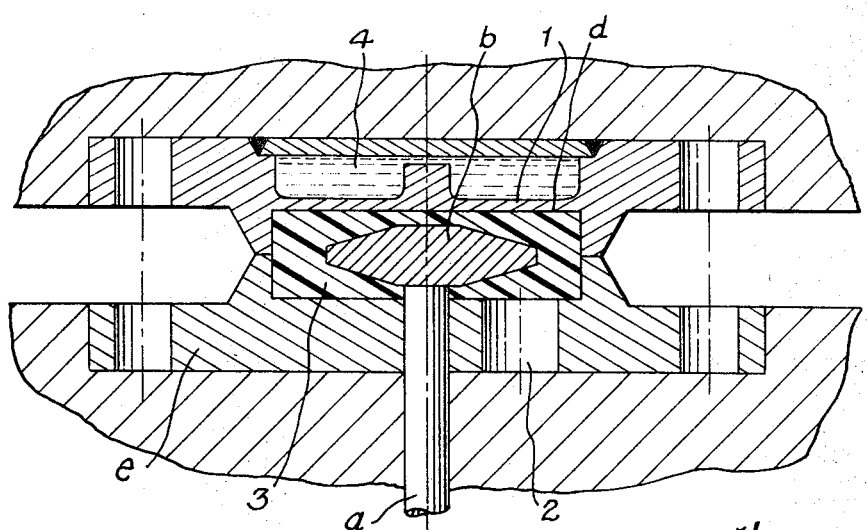
FIG. 2 is a similar view through the test instrument of this invention.

In this invention, FIG. 2, the chamber $d$ contains a flexible membrane 1 and a pressure sensitive element 2. One side of membrane 1 bears on the test material 3, while the other side is contacted by the pressure fluid 4. Suitable means are provided for the supply and discharge of fluid 4 at different pressures and using pressure sensitive element 2 as a control.

Figure 2A:
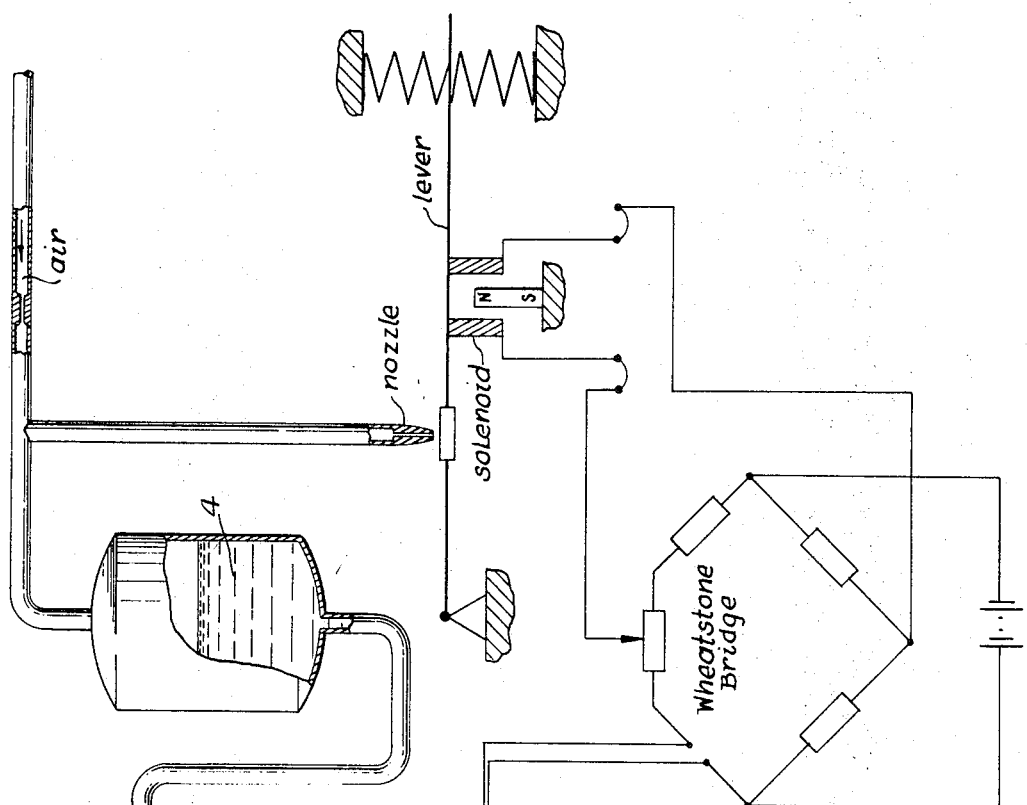
FIG. 2a is a diagrammatic view of FIG. 2 connected to a test control system composed of conventional elements.
Figure 2A:
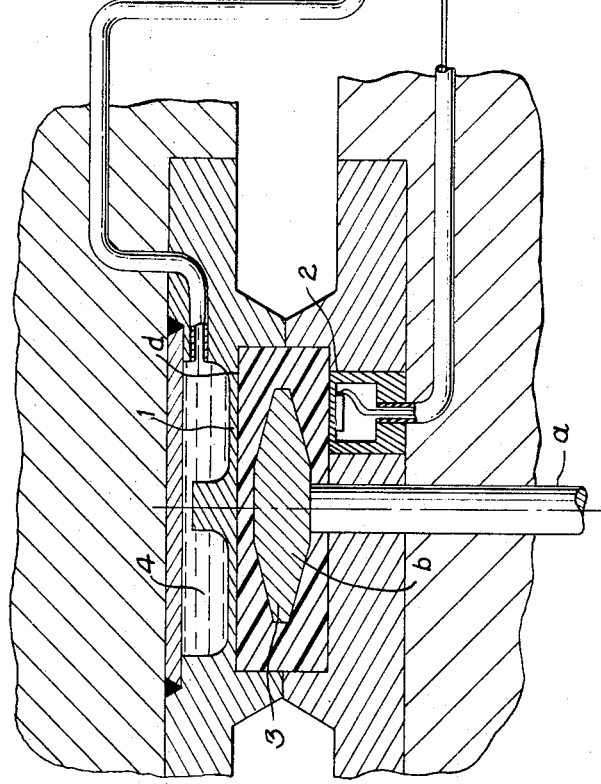

As shown in FIG. 2a, compressed air is supplied to a tank containing fluid 4. The air pressure changing means in the tank is effected by regulating the escape of air through a nozzle by means of a lever. A solenoid on the other side of the lever is actuated by being coupled through a Wheatstone bridge to the pressure sensitive element 2, composed of a diaphragm and a strain gauge, and functions with the lever to measure the pressure in test chamber $d$ for comparing it with calculated theoretical pressure value for said chamber.

In FIG. 3, curve 1 is for a torsion-thrust vulcameter. Curve 2 is for a Mooney shearing disc plastometer. Curve 3 shows an inconsistency occurring in the curves.

The torsion-thrust vulcameter is a combination of the shearing disc plastometer disclosed by Mooney in DIN-Normblatt 53 523 and the Agfa-vulcameter disclosed in Caoutchouc and Rubber, 10 (1957), pages 168–172. A mushroom shaped rotor is rotated around the axis $x$—$x$ in FIG. 1 with a periodically alternating rotation in the test material contained in the testing chamber in the mold. The mold is heated and separable for the insertion and removal of the test material.

The angle of the rator rotation has an amplitude ordinarily below 5° and a frequency changeable over a wide range, as, for example, 3/min. to 1000/min. During the alternating rotor movement, the test material exerts a reaction torque on the rotor axis. The largest amplitude torque point produced on the shearing disc and/or the rotor is measured by a torque measuring shaft and transmitted into an instrument which prints it out. The printed graph shows the periodic changes of the torque point and thus indicates the material characteristic of the test material. This is especially true during vulcanization as the test material is vulcanized in the test chamber at a range of 120 to 200° C. and the torque point rises from a minimum value such as 0.02 mkp. as a transition from which it can be mathematically calculated to a maximum value of 0.9 mkp. Note Caoutchouc and Rubber, Synthetics, 19 (1966), pages 127–132, and Caoutchouc and Rubber, Synthetics, 17 (1964), pages 493–497.

The advantage of the torsion-thrust vulcameter as compared to the Agfa-vulcameter lies in that the chemical reaction takes place in a closed test chamber which is sealed off from the oxygen in the air and for all practical purposes has readings that are unchanged. The advantage over the Mooney apparatus lies in that the technical material characteristics of the test material can be observed up to the optimum vulcanization point as shown by curve 1 in FIG. 3. In the Mooney apparatus which has a shearing disc that rotates continuously in the same direction, the optimum vulcanization point cannot be seen because the test material separates from the shearing disc when a certain degree of vulcanization occurs as shown by curve 2 in FIG. 3.

Nevertheless, extensive measurement tests have shown that the optimum vulcanization point cannot be completely satisfactorily observed in every case when a torsion-thrust vulcameter is used. While, for example, natural caoutchouc-dicumyl peroxide-vulcanisate, with or without a carbon black filler, can be measured satisfactorily up to the optimum vulcanization point as shown by curve 1 in FIG. 3, a falling off of the torque point before the optimum vulcanization point is reached occurs with synthetic rubber and sulfur vulcanization as customarily used in practice. This falling off or reduction is often directly recognized by the course of the curve plotted by the torque measuring apparatus and can be recognized by an inconsistent point U shown for curve 3 in FIG. 3. However, this reduction occurs quite often as being completely constant as shown by curve 4 in FIG. 3. This is especially annoying because the operator of the test cannot immediately recognize the inconsistency of the curve.

It is assumed that the reduction in the torque and the erroneous vulcanization recordings are due to a shrinking of the test material as it polymerizes. The test material separates slightly from the walls of the testing chamber and from the shearing disc which means that the torque resistance of the test material is lowered. In this invention, the reduction in pressure caused by the shrinking of the test material is compensated for by slightly reducing the volume of the test chamber by means of a membrane and thus it is possible to again pick up the torque reduction as indicated by the point V in curve 3 of FIG. 3.

As described in the ASTM Special Technical Publication No. 383, April, 1965, pages 51 to 75, the upper half of the test chamber in the torsion-thrust vulcameter or rheometer is provided with a passive membrane. Clearly, this membrane which is pushed by a weak spring is supposed to bulge out as the test chamber is filled and closed with the test material and then spring back when the test material shrinks. This is supposed to make sure that the test material continuously clings to the walls of the test chamber.

However, tests made with this rheometer have shown that such a passive membrane is not able to prevent a torque reduction.

In this invention, it has been found that the undesirable torque reduction during testing can be prevented when the interior pressure of the test chamber can be changed by means of an actively adjustable membrane or some analogous adjusting element. Another advantageous feature of this invention is in that the interior pressure of the test chamber is measured continuously by means of a pressure sensitive element. This measured interior pressure is then compared with the theoretical pressure value and the difference between the actual and theoretical values is used to control the interior pressure of the chamber.

As shown in FIG. 2, the interior pressure of the test chamber is continuously measured by means of a pressure sensitive element 2. This pressure is compared with a chosen theoretical value. When the interior pressure in the chamber drops, then the fluid pressure on membrane 1 is increased by means of an adjustable liquid pump so much as to increase the pressure on the test material to the selected initial pressure.

Another form of construction for preventing torque reduction is also possible for any routine standard tests. The test material is inserted in the chamber when the membrane is not under pressure and the membrane held passive until polymerization starts. This latter, when vulcanisates are used, begins after the required incubation time and lies within the customary temperatures needed for vulcanization at 10 minutes. After polymerization has started, the membrane is pressed a few tenths of a millimeter into the test material by means of compressed oil or a mechanical device. In this case, the control of the interior pressure in the chamber is replaced by a pressure control apparatus. This operating manner is less expensive with regard to the apparatus but also has the disadvantage in that the most favorable time point for the necessary increase in pressure must be determined by a series of preliminary tests made on the test material.

The advantages of this invention using a testing chamber that is controlled by an active pressure of the membrane and/or adjusted by an active pressure of the membrane as contrasted to the prior art are in that:

(1) The torque reduction often measured in oscillating disc rheometers and which can lead to a misinterpretation of the measured results is prevented;

(2) The useful range of the oscillating disc rheometer is increased by the testing chamber; and (3) The accuracy and consistency of the measured results is improved significantly.

Having now described the means by which the objects of this invention are obtained,

We claim:

1. An apparatus for adjusting or controlling the pressure in the test chamber for an oscillating disc rheometer comprising heatable test chamber means for holding test material, an oscillating disc rheometer coupled to said chamber, and fluid pressure operated membrane means in said chamber for changing the pressure on the test material.

2. A method for adjusting or controlling the pressure in the test chamber of a measuring apparatus such as an oscillating disc rheometer for testing the resistance to shearing and the effect of vulcanization on plastic and rubber elastic materials comprising changing the fluid pressure on an active flexible adjustable membrane in the interior of the test chamber, and measuring the pressure in said chamber by means of a pressure sensitive element communicating with said chamber.

3. A method for adjusting or controlling the pressure in the test chamber of a measuring apparatus such as an oscillating disc rheometer for testing the resistance to shearing and the effect of vulcanization on plastic and rubber elastic materials comprising changing the fluid pressure on an active flexible adjustable membrane in the interior of the test chamber, measuring the actual interior pressure in said chamber, comparing the actual interior pressure value with the theoretical pressure value for said chamber, and using the difference between the actual and theoretical values to control the pressure on said membrane.

References Cited

UNITED STATES PATENTS

| 2,754,675 | 7/1956 | More | 73—15.6 |
| 3,387,490 | 6/1968 | Wise | 73—101 |

JERRY W. MYRACLE, Primary Examiner

U.S. Cl. X.R.

73—15.6